United States Patent
Adams et al.

(10) Patent No.: US 11,072,143 B2
(45) Date of Patent: Jul. 27, 2021

(54) FLEXIBLE COMPOSITE SYSTEMS AND METHODS

(71) Applicant: DSM IP ASSETS B.V., Heerlen (NL)

(72) Inventors: Christopher Michael Adams, Mesa, AZ (US); Wesley Edward Hatcher, Mesa, AZ (US); Keith Joel McDaniels, Phoenix, AZ (US)

(73) Assignee: DSM IP ASSETS B.V, Heerlen (NL)

( * ) Notice: Subject to any disclaimer, the term of this patent is extended or adjusted under 35 U.S.C. 154(b) by 875 days.

(21) Appl. No.: 14/774,581

(22) PCT Filed: Mar. 13, 2014

(86) PCT No.: PCT/US2014/026796
§ 371 (c)(1),
(2) Date: Sep. 10, 2015

(87) PCT Pub. No.: WO2014/160483
PCT Pub. Date: Oct. 2, 2014

(65) Prior Publication Data
US 2016/0023428 A1    Jan. 28, 2016

Related U.S. Application Data

(60) Provisional application No. 61/780,821, filed on Mar. 13, 2013.

(51) Int. Cl.
*B32B 5/02*      (2006.01)
*B32B 5/26*      (2006.01)
(Continued)

(52) U.S. Cl.
CPC .............. *B32B 5/028* (2013.01); *B32B 5/022* (2013.01); *B32B 5/024* (2013.01); *B32B 5/10* (2013.01);
(Continued)

(58) Field of Classification Search
CPC ..... B32B 5/022; B32B 5/028; B32B 2260/00; B32B 2260/021; B32B 2260/023;
(Continued)

(56) References Cited

U.S. PATENT DOCUMENTS

| 1,287,945 A | 12/1918 | Ford |
| 2,232,640 A | 2/1941 | Schwartzman |

(Continued)

FOREIGN PATENT DOCUMENTS

| CN | 1727571 | 2/2006 |
| CN | 101723067 | 6/2010 |

(Continued)

OTHER PUBLICATIONS

U.S. Appl. No. 14/309,578, filed Jun. 19, 2014, Waterproof Breathable Composite Materials for Fabrication of Flexible Membranes and Other Articles.

(Continued)

*Primary Examiner* — Arti Singh-Pandey
(74) *Attorney, Agent, or Firm* — Snell & Wilmer L.L.P.

(57) ABSTRACT

In various embodiments, an improved flexible-composite material is described that comprises at least one scrim constructed from at least two unidirectional tape layers bonded together and at least one woven fabric, non-woven fabric, or membrane bonded to the scrim. In various embodiments, the unidirectional tape layers comprise a plurality of parallel fiber bundles comprising monofilaments within an adhesive resin. In various embodiments, the fiber bundles are separated by gaps that can be filled in by adhesive or non-adhesive resin.

17 Claims, 2 Drawing Sheets

(51) Int. Cl.
*B32B 5/10* (2006.01)
*B32B 5/12* (2006.01)
*B32B 27/12* (2006.01)
*B32B 27/32* (2006.01)
*B32B 27/34* (2006.01)
*B32B 27/36* (2006.01)
*B32B 27/40* (2006.01)
*B32B 37/12* (2006.01)

(52) U.S. Cl.
CPC ............ *B32B 5/12* (2013.01); *B32B 5/26* (2013.01); *B32B 27/12* (2013.01); *B32B 27/322* (2013.01); *B32B 27/34* (2013.01); *B32B 27/36* (2013.01); *B32B 27/40* (2013.01); *B32B 37/12* (2013.01); *B32B 2260/00* (2013.01); *B32B 2260/021* (2013.01); *B32B 2260/023* (2013.01); *B32B 2260/046* (2013.01); *B32B 2305/08* (2013.01); *B32B 2305/38* (2013.01); *B32B 2307/546* (2013.01); *B32B 2307/724* (2013.01); *Y10T 442/184* (2015.04); *Y10T 442/197* (2015.04)

(58) Field of Classification Search
CPC . B32B 2260/046; B32B 2305/38; B32B 5/10; B32B 5/12; B32B 5/26; B32B 2305/08; B32B 2307/546; B32B 2307/724; B32B 27/12; B32B 27/322; B32B 27/34; B32B 27/36; B32B 27/40; B32B 37/12; B32B 5/024; Y10T 442/184; Y10T 442/197
See application file for complete search history.

(56) References Cited

U.S. PATENT DOCUMENTS

| | | |
|---|---|---|
| 2,522,346 A | 9/1950 | Carson |
| 2,584,632 A | 2/1952 | Southwick |
| 2,679,194 A | 5/1954 | Ehrenfried |
| 2,748,048 A | 5/1956 | Russel |
| 3,335,045 A | 8/1967 | Post |
| 3,644,165 A | 2/1972 | Chen |
| 4,475,976 A | 10/1984 | Mittelstadt |
| 4,565,714 A | 1/1986 | Koshar |
| 4,588,538 A | 5/1986 | Chung et al. |
| 4,637,851 A | 1/1987 | Ueno |
| 4,679,519 A | 7/1987 | Linville |
| 4,708,080 A | 11/1987 | Conrad |
| 4,757,742 A | 7/1988 | Mazelsky |
| 4,762,751 A | 8/1988 | Girgis et al. |
| 4,803,029 A | 2/1989 | Iversen |
| 4,806,400 A | 2/1989 | Sancaktar |
| 4,916,000 A | 4/1990 | Li |
| 4,944,974 A * | 7/1990 | Zachariades ......... A61L 27/507 428/36.1 |
| 4,991,317 A | 2/1991 | Lakic |
| 5,001,003 A | 3/1991 | Mahr |
| 5,025,575 A | 6/1991 | Lakic |
| 5,094,883 A | 3/1992 | Muzzy et al. |
| 5,106,568 A | 4/1992 | Honka |
| 5,167,876 A | 12/1992 | Lem |
| 5,173,138 A | 12/1992 | Blauch |
| 5,217,797 A | 6/1993 | Knox et al. |
| 5,279,879 A | 1/1994 | Takezawa |
| 5,292,475 A | 3/1994 | Mead et al. |
| 5,333,568 A | 8/1994 | Meldner et al. |
| 5,403,641 A | 4/1995 | Linville et al. |
| 5,419,726 A | 5/1995 | Switlik |
| 5,470,632 A | 11/1995 | Meldner et al. |
| 5,514,431 A | 5/1996 | Shimomura |
| 5,591,933 A | 1/1997 | Li et al. |
| 5,648,109 A | 7/1997 | Gutowski |
| 5,729,834 A | 3/1998 | Sloot |
| 5,922,161 A | 7/1999 | Wu et al. |
| 5,940,991 A | 8/1999 | Cabalquinto |
| 6,000,055 A * | 12/1999 | Citerio ................ B32B 5/26 2/2.5 |
| 6,014,823 A | 1/2000 | Lakic |
| 6,048,622 A | 4/2000 | Hagood |
| 6,071,834 A | 6/2000 | Martz |
| 6,168,855 B1 | 1/2001 | Cohen |
| 6,176,957 B1 | 1/2001 | Bolitsky |
| 6,224,951 B1 | 5/2001 | Centanni et al. |
| 6,355,123 B1 | 3/2002 | Baker et al. |
| 6,361,642 B1 | 3/2002 | Bellamy et al. |
| 6,454,893 B1 | 9/2002 | McKague |
| 6,565,944 B1 | 5/2003 | Hartness |
| 6,627,034 B1 | 9/2003 | Ufer |
| 6,761,795 B2 | 7/2004 | Chapuis et al. |
| 6,846,548 B2 | 1/2005 | Harpell et al. |
| 7,156,787 B2 | 1/2007 | Kemery et al. |
| 7,211,291 B2 * | 5/2007 | Harpell ................ B29C 70/504 427/180 |
| 7,226,878 B2 | 6/2007 | Wagner et al. |
| 7,601,416 B2 | 10/2009 | Palley |
| 7,622,014 B2 | 11/2009 | Millette |
| 7,892,374 B2 | 2/2011 | Pekar |
| 7,943,076 B1 | 5/2011 | Hawkins |
| 7,950,676 B2 | 5/2011 | Goldsmith |
| 7,985,463 B2 | 7/2011 | Stowell et al. |
| 8,080,487 B2 | 12/2011 | Gardner et al. |
| 8,147,644 B2 | 4/2012 | Tippins |
| 8,256,019 B2 | 9/2012 | Ardiff et al. |
| 8,343,574 B2 | 1/2013 | Downs et al. |
| 8,540,838 B2 | 9/2013 | Millette |
| 8,572,786 B2 | 11/2013 | Davis et al. |
| 8,632,653 B2 | 1/2014 | Brown et al. |
| 8,673,102 B2 | 3/2014 | Kemery et al. |
| 8,784,968 B2 | 7/2014 | Adams et al. |
| 8,802,189 B1 | 8/2014 | Downs et al. |
| 9,022,417 B2 | 5/2015 | Breed |
| 9,079,218 B2 | 7/2015 | Downs et al. |
| 9,114,570 B2 | 8/2015 | Downs et al. |
| 9,198,477 B2 | 12/2015 | Davis et al. |
| 9,339,842 B2 | 5/2016 | Downs et al. |
| 9,358,755 B2 | 6/2016 | Adams et al. |
| 9,516,921 B2 | 12/2016 | Millette |
| 9,630,390 B2 | 4/2017 | Brown et al. |
| 9,737,110 B2 | 8/2017 | Davis et al. |
| 9,789,662 B2 | 10/2017 | Downs et al. |
| 9,944,042 B2 | 4/2018 | Adams et al. |
| 9,993,978 B2 | 6/2018 | Downs et al. |
| 2002/0182955 A1 | 12/2002 | Weglewski et al. |
| 2003/0022578 A1 | 1/2003 | Lubker, II |
| 2003/0064188 A1 | 4/2003 | Patel et al. |
| 2004/0012118 A1 | 1/2004 | Perez |
| 2004/0084138 A1 | 5/2004 | Henke et al. |
| 2004/0102125 A1 | 5/2004 | Morman et al. |
| 2004/0171321 A1 | 9/2004 | Plant |
| 2005/0086916 A1 | 4/2005 | Caron |
| 2005/0112968 A1 | 5/2005 | Panse |
| 2006/0191627 A1 | 8/2006 | Geddes et al. |
| 2006/0192373 A1 | 8/2006 | Manley |
| 2006/0249868 A1 | 11/2006 | Brown |
| 2007/0039683 A1 | 2/2007 | Morin |
| 2007/0184263 A1 | 8/2007 | Rodewald et al. |
| 2007/0278155 A1 | 12/2007 | Lo et al. |
| 2007/0290942 A1 | 12/2007 | Morin |
| 2008/0063806 A1 | 3/2008 | Janssen |
| 2008/0081171 A1 | 4/2008 | DuPont |
| 2008/0116043 A1 | 5/2008 | Chahal et al. |
| 2008/0118639 A1 | 5/2008 | Arvidson et al. |
| 2008/0230173 A1 | 9/2008 | Cho et al. |
| 2009/0042471 A1 | 2/2009 | Cashin et al. |
| 2009/0047483 A1 | 2/2009 | Sugahara et al. |
| 2009/0169825 A1 | 7/2009 | Farmer et al. |
| 2009/0169835 A1 | 7/2009 | Stowell et al. |
| 2009/0218672 A1 | 9/2009 | Nakamura |
| 2009/0309260 A1 | 12/2009 | Keuchel |
| 2010/0028593 A1 | 2/2010 | Takata et al. |
| 2010/0304072 A1 | 2/2010 | Alvelind |
| 2010/0112283 A1 | 5/2010 | Howarth |
| 2010/0152654 A1 | 6/2010 | Tilson et al. |

(56) References Cited

U.S. PATENT DOCUMENTS

| | | | |
|---|---|---|---|
| 2010/0168704 A1 | 7/2010 | Thomas et al. | |
| 2010/0222522 A1 | 9/2010 | Steele | |
| 2011/0233342 A1* | 9/2011 | Marissen | D01F 6/04 244/153 R |
| 2011/0312238 A1 | 12/2011 | Bader et al. | |
| 2012/0070741 A1 | 3/2012 | Liu | |
| 2012/0100334 A1 | 4/2012 | Adams et al. | |
| 2012/0118615 A1 | 5/2012 | Lee et al. | |
| 2012/0169552 A1 | 7/2012 | Lee | |
| 2012/0174753 A1 | 7/2012 | Wagner et al. | |
| 2012/0186430 A1 | 7/2012 | St. Claire et al. | |
| 2012/0150169 A1 | 10/2012 | Chiou | |
| 2012/0276380 A1 | 11/2012 | Traser et al. | |
| 2012/0295052 A1 | 11/2012 | Choi | |
| 2013/0126533 A1 | 5/2013 | Klosky | |
| 2013/0280476 A1 | 10/2013 | Davis | |
| 2014/0087614 A1 | 3/2014 | Matsuda | |
| 2014/0087616 A1 | 3/2014 | Adams et al. | |
| 2014/0119703 A1 | 5/2014 | Hinaga | |
| 2014/0134378 A1 | 5/2014 | Downs et al. | |
| 2014/0308510 A1 | 10/2014 | Downs et al. | |
| 2014/0311329 A1 | 10/2014 | Dyke et al. | |
| 2014/0335750 A1 | 11/2014 | Adams et al. | |
| 2014/0363615 A1 | 12/2014 | Adams et al. | |
| 2014/0363646 A1 | 12/2014 | Hayashi | |
| 2015/0010706 A1 | 1/2015 | Downs et al. | |
| 2015/0082976 A1 | 3/2015 | Downs et al. | |
| 2015/0083473 A1 | 3/2015 | Downs et al. | |
| 2015/0266053 A1 | 9/2015 | Downs et al. | |
| 2015/0275051 A1 | 10/2015 | Downs | |
| 2016/0001472 A1 | 1/2016 | Downs et al. | |
| 2016/0023428 A1 | 1/2016 | Adams et al. | |
| 2016/0031164 A1 | 2/2016 | Downs et al. | |
| 2016/0033236 A1 | 2/2016 | Meldner et al. | |
| 2016/0037633 A1 | 2/2016 | Downs et al. | |

FOREIGN PATENT DOCUMENTS

| | | |
|---|---|---|
| DE | 4010086 | 11/1990 |
| DE | 202011004434 | 6/2011 |
| EP | 0361796 | 4/1990 |
| EP | 0515992 | 12/1992 |
| EP | 0579047 | 1/1994 |
| EP | 0699877 | 3/1996 |
| EP | 0967071 | 12/1999 |
| EP | 1582107 | 10/2005 |
| EP | 2133464 | 12/2009 |
| GB | 2051674 | 1/1981 |
| JP | 57027738 | 2/1928 |
| JP | 01123727 | 5/1989 |
| JP | H0446202 | 7/1992 |
| JP | 2000234257 | 8/2000 |
| JP | 2002020501 | 1/2002 |
| JP | 2002539036 | 11/2002 |
| JP | 2004218170 | 8/2004 |
| JP | 2006322077 | 11/2006 |
| JP | 2007135213 | 5/2007 |
| JP | 2007321652 | 12/2007 |
| JP | 2008274516 | 11/2008 |
| JP | 2011245745 | 12/2011 |
| WO | 1988009630 | 12/1988 |
| WO | 1994011185 | 5/1994 |
| WO | 1998030397 | 7/1998 |
| WO | 2000002427 | 1/2000 |
| WO | 2000051458 | 9/2000 |
| WO | 2001028196 | 4/2001 |
| WO | 2002047899 | 6/2002 |
| WO | 2003005684 | 1/2003 |
| WO | 2005025841 | 3/2005 |
| WO | 2007122009 | 11/2007 |
| WO | 2008116702 | 10/2008 |
| WO | 2009036139 | 3/2009 |
| WO | 2009059402 | 5/2009 |
| WO | 2011076914 | 6/2011 |
| WO | 2011163643 | 12/2011 |
| WO | 2012017233 | 2/2012 |
| WO | 2012018959 | 2/2012 |
| WO | 2012150169 | 11/2012 |
| WO | 2014044688 | 3/2014 |
| WO | 2014047227 | 3/2014 |
| WO | 2014047663 | 3/2014 |
| WO | 2014084947 | 6/2014 |
| WO | 2014074966 | 7/2014 |
| WO | 2014160483 | 10/2014 |
| WO | 2014160492 | 10/2014 |
| WO | 2014160498 | 10/2014 |
| WO | 2014160506 | 10/2014 |

OTHER PUBLICATIONS

U.S. Appl. No. 14/791,025, filed Jul. 2, 2015, Systems and Method for Producing Three-Dimensional Articles From Flexible Composite Materials.
U.S. Appl. No. 14/732,210, filed Jun. 5, 2015, System and Method for the Transfer of Color and Other Physical Properties to Laminate Composite Materials and Other Articles.
U.S. Appl. No. 14/207,790, filed Mar. 13, 2014, Engineered Composite Systems.
U.S. Appl. No. 13/922,128 U.S. Pat. No. 9,154,593, filed Jun. 19, 2013 Oct. 6, 2015, Flotation and Related Integrations to Extend the Use of Electronic Systems.
USPTO; Final Office Action dated Nov. 25, 2015 in U.S. Appl. No. 14/031,040.
USPTO; Non-Final Office Action dated Jun. 3, 2016 in U.S. Appl. No. 14/031,040.
USPTO; Non-Final Office Action dated Jan. 6, 2016 in U.S. Appl. No. 14/309,578.
USPTO; Notice of Allowance dated Feb. 8, 2016 in U.S. Appl. No. 14/309,578.
EPO; Extended Search Report dated Feb. 19, 2016 in Application No. EP 11815290.9.
EPO; European Search Report dated May 3, 2016 in Application 13839426.7.
EPO; European Search Report dated Jun. 8, 2016 in Application No. 13838954.9.
EPO; European Search Report dated Jun. 28, 2016 in Application No. 13853204.9.
PCT; International Search Report and Written Opinion dated Jul. 4, 2016 in Application No. PCT/IB2016/000568.
USPTO; Non-Final Office Action dated Sep. 10, 2013 in U.S. Appl. No. 13/168,912.
USPTO; Notice of Allowance dated Mar. 21, 2014 in U.S. Appl. No. 13/168,912.
USPTO; Office Action dated Mar. 21, 2012 in U.S. Appl. No. 13/197,741.
USPTO; Notice of Allowance dated Oct. 4, 2012 in U.S. Appl. No. 13/197,741.
USPTO; Office Action dated Jul. 17, 2013 in U.S. Appl. No. 13/727,919.
USPTO; Office Action dated Dec. 20, 2013 in U.S. Appl. No. 13/727,919.
USPTO; Advisory Action dated Jan. 28, 2014 in U.S. Appl. No. 13/727,919.
USPTO; Notice of Allowance dated Apr. 11, 2014 in U.S. Appl. No. 13/727,919.
USPTO; Non-Final Office Action dated Jan. 14, 2015 in U.S. Appl. No. 13/922,128.
USPTO; Notice of Allowance dated Jun. 1, 2015 in U.S. Appl. No. 13/922,128.
USPTO; Non-Final Office Action dated May 8, 2015 in U.S. Appl. No. 14/031,040.
USPTO; Notice of Allowance dated Apr. 24, 2015 in U.S. Appl. No. 14/076,201.
USPTO; Non-Final Office Action dated Jul. 17, 2015 in U.S. Appl. No. 14/208,017.
USPTO; Non-Final Office Action dated Nov. 19, 2014 in U.S. Appl. No. 14/326,261.

(56) References Cited

OTHER PUBLICATIONS

USPTO; Notice of Allowance dated Mar. 10, 2015 in U.S. Appl. No. 14/326,261.
USPTO; Non-Final Office Action dated Jul. 30, 2015 in U.S. Appl. No. 14/732,210.
PCT; International Search Report dated Feb. 10, 1994 in Application No. PCT/US1993/011425.
PCT; International Search Report dated Oct. 31, 2011 in Application No. PCT/US2011/041914.
PCT; Written Opinion of the International Search Authority dated Oct. 31, 2011 in Application No. PCT/US2011/041914.
PCT; International Preliminary Report on Patentability dated May 17, 2012 in Application No. PCT/US2011/041914.
PCT; International Search Report dated Dec. 16, 2011 in Application No. PCT/US2011/046497.
PCT; Written Opinion of the International Searching Authority dated Dec. 16, 2011 in Application No. PCT/US2011/046497.
PCT; International Search Report and Written Opinion dated Feb. 21, 2014 in Application No. PCT/US2013/061509.
PCT; International Search Report and Written Opinion dated Feb. 28, 2014 in Application No. PCT/US2013/060487.
PCT; International Search Report and Written Opinion dated May 7, 2014 in Application No. PCT/US2013/069364.
PCT; International Search Report and Written Opinion dated Aug. 14, 2014 in Application No. PCT/US2014/026796.
PCT; International Search Report and Written Opinion dated Aug. 11, 2014 in Application No. PCT/US2014/026828.
PCT; International Search Report and Written Opinion dated Aug. 20, 2014 in Application No. PCT/US2014/026856.
PCT; International Search Report and Written Opinion dated Dec. 11, 2014 in Application No. PCT/US2014/026870.
EPO; Supplementary European Search Report dated Jul. 27, 1995 in Application No. EP 94902379.
EPO; Office Action dated Apr. 4, 1997 in Application No. EP 94902379.
EPO; Office Action dated Jul. 22, 1998 in Application No. EP 94902379.
EPO; Office Action dated Jun. 17, 1999 in Application No. EP 94902379.
EPO; Office Action dated Aug. 17, 2000 in Application No. EP 94902379.
EPO; European Search Report dated Jan. 7, 2015 in Application No. EP 11799030.9.
CPO; Office Action dated Apr. 2, 2014 in Application No. CN 201180037975.6.
CPO; Office Action dated Nov. 15, 2014 in Application No. CN 201180037975.6.
CPO; Office Action dated Jun. 6, 2014 in Application No. CN 201180031205.0.
CPO; Office Action dated Oct. 8, 2014 in Application No. CN 201180031205.0.
Bralla, "Handbook of Manufacturing Processes—How Products, Components and Materials are Made," Industrial Press, pp. 411, (2007).
eFunda, "Polymers Sorted by Thermoplastic/ Thermoset," pp. 1-2, (2008).
Elaldi et al., "Machining and Joining Process," Smithers Rapra Technology, 7, pp. 163-181, (2001).
Huntsman, "Modification of Polyolefins with Elastamine Polyetheramines," pp. 1-3, (2009).
Schaefer, "Nip Rolls," pp. 1, (2009).
Tomsic, "Dictionary of Materials and Testing," SAE International, 2, pp. 205, (2000).
Troughton, "Handbook of Plastics Joining—A Practical Guide: Chapter 17 A160-Adhesive Bonding," William Andrew Publishing, 2, pp. 145-173, (2008).
USPTO; Final Office Action dated Nov. 15, 2016 in U.S. Appl. No. 14/031,040.
USPTO; Non-Final Office Action dated Jun. 28, 2017 in U.S. Appl. No. 14/031,040.
USPTO; Final Office Action dated Feb. 22, 2018 in U.S. Appl. No. 14/031,040.
USPTO; Notice of Allowance dated Jun. 13, 2017 in U.S. Appl. No. 14/207,790.
USPTO; Non-Final Office Action dated Sep. 22, 2017 in U.S. Appl. No. 14/207,891.
USPTO; Final Office Action dated Mar. 9, 2018 in U.S. Appl. No. 14/207,891.
USPTO; Final Office Action dated Feb. 12, 2016 in U.S. Appl. No. 14/208,017.
USPTO; Non-Final Office Action dated Jan. 10, 2018 in U.S. Appl. No. 14/208,107.
USPTO; Final Office Action dated Aug. 25, 2017 in U.S. Appl. No. 14/430,340.
USPTO; Notice of Allowance dated Jan. 21, 2016 in U.S. Appl. No. 14/732,210.
USPTO; Non-Final Office Action dated Feb. 7, 2018 in U.S. Appl. No. 14/774,490.
USPTO; Non-Final Office Action dated Feb. 2, 2016 in U.S. Appl. No. 14/774,562.
USPTO; Final Office Action dated Sep. 21, 2017 in U.S. Appl. No. 14/774,594.
USPTO; Non-Final Office Action dated Feb. 13, 2018 in U.S. Appl. No. 14/774,594.
USPTO; Final Office Action dated Sep. 25, 2017 in U.S. Appl. No. 14/791,025.
USPTO; Notice of Allowance dated Feb. 14, 2018 in U.S. Appl. No. 14/791,025.
USPTO; Non-Final Office Action dated Jul. 27, 2017 in U.S. Appl. No. 15/162,211.
USPTO; Notice of Allowance dated Dec. 14, 2017 in U.S. Appl. No. 15/162,211.
USPTO; Non-Final Office Action dated Apr. 6, 2018 in U.S. Appl. No. 15/719,167.
U.S. Appl. No. 13/168,912 U.S. Pat. No. 8,784,968, filed Jun. 24, 2011 Jul. 22, 2014, Waterproof Breathable Composite Materials for Fabrication of Flexible Membranes and Other Articles.
U.S. Appl. No. 14/309,578 U.S. Pat. No. 9,358,755, filed Jun. 19, 2014 Jun. 7, 2016, Waterproof Breathable Composite Materials for Fabrication of Flexible Membranes and Other Articles.
U.S. Appl. No. 15/162,211 U.S. Pat. No. 9,944,042, filed May 23, 2016 Apr. 17, 2018, Waterproof Breathable Composite Materials for Fabrication of Flexible Membranes and Other Articles.
U.S. Appl. No. 13/197,741 U.S. Pat. No. 8,343,574, filed Aug. 3, 2011 Jan. 1, 2013, System and Method for the Transfer of Color and Other Physical Properties to Laminate Composite Materials and Other Articles.
U.S. Appl. No. 14/031,040, filed Sep. 18, 2013, Flexible Composite Systems.
U.S. Appl. No. 14/430,340, filed Mar. 23, 2015, Adherable Flexible Composite Systems.
U.S. Appl. No. 14/076,201 U.S. Pat. No. 9,114,570, filed Nov. 9, 2013 Aug. 25, 2015, Systems and Method for Producing Three-Dimensional Articles From Flexible Composite Materials.
U.S. Appl. No. 14/791,025 U.S. Pat. No. 9,993,978, filed Jul. 2, 2015 Jun. 12, 2018, Systems and Method for Producing Three-Dimensional Articles From Flexible Composite Materials.
U.S. Appl. No. 13/727,919 U.S. Pat. No. 8,802,189, filed Dec. 27, 2012 Aug. 12, 2014, System and Method for the Transfer of Color and Other Physical Properties to Laminate Composite Materials and Other Articles.
U.S. Appl. No. 14/326,261 U.S. Pat. No. 9,079,218, filed Jul. 8, 2014 Jul. 14, 2015, System and Method for the Transfer of Color and Other Physical Properties to Laminate Composite Materials and Other Articles.
U.S. Appl. No. 14/732,210 U.S. Pat. No. 9,339,842, filed Jun. 5, 2015 May 17, 2016, System and Method for the Transfer of Color and Other Physical Properties to Laminate Composite Materials and Other Articles.
U.S. Appl. No. 14/774,490, filed Sep. 10, 2015, Systems and Method for Producing Three-Dimensional Articles from Flexible Composite Materials.

(56) References Cited

OTHER PUBLICATIONS

U.S. Appl. No. 14/207,790 U.S. Pat. No. 9,789,662, filed Mar. 13, 2014 Oct. 17, 2017, Engineered Composite Systems.
U.S. Appl. No. 15/719,167, filed Sep. 28, 2017, Engineered Composite Systems.
U.S. Appl. No. 14/774,562, filed Sep. 10, 2015, Light-Weight Semi-Rigid Composite Anti-Ballistic Systems With Engineered Compliance and Rate-Sensitive Impact Response.
U.S. Appl. No. 14/208,017, filed Mar. 13, 2014, Light-Weight Semi-Rigid Composite Anti-Ballistic Systems With Engineered Compliance and Rate-Sensitive Impact Response.
U.S. Appl. No. 14/207,891, filed Mar. 13, 2014, Flexible Composite Systems.
U.S. Appl. No. 14/774,594, filed Sep. 10, 2015, Flexible Electronic Fiber-Reinforced Composite Materials.
U.S. Appl. No. 14/208,107, filed Mar. 13, 2014, Flexible Electronic Fiber-Reinforced Composite Materials.
U.S. Appl. No. 13/922,128, filed Jun. 19, 2013, Flotation and Related Integrations to Extend the Use of Electronic Systems.
USPTO; Non-Final Office Action dated Nov. 18, 2016 in U.S. Appl. No. 14/207,790.
USPTO; Non-Final Office Action dated Sep. 9, 2016 in U.S. Appl. No. 14/208,107.
USPTO; Final Office Action dated Apr. 28, 2017 in U.S. Appl. No. 14/208,107.
USPTO; Non-Final Office Action dated Oct. 4, 2016 in U.S. Appl. No. 14/430,340.
USPTO; Final Office Action dated Dec. 1, 2016 in U.S. Appl. No. 14/774,562.
USPTO; Non-Final Office Action dated May 1, 2017 in U.S. Appl. No. 14/774,594.
USPTO; Non-Final Office Action dated Apr. 4, 2017 in U.S. Appl. No. 14/791,025.
USPTO; Non-Final Office Action dated Mar. 10, 2017 in U.S. Appl. No. 14/207,891.
PCT; International Search Report and Written Opinion dated Aug. 26, 2016 in Application No. PCT/IB2016/000919.
Chawla, "Composite Materials" Science and Engineering, Third Edition, Springer, 7-68 (2012).
Sanborn et al., "Tensile Prperties of Dyneema SK76 Single Fibers at Multiple Loading Rates Using a Dirct Gripping Method", J. Dynamic Behavior Mater. 2: 4-14 (2015).

\* cited by examiner

FLEXIBLE COMPOSITE SYSTEMS AND METHODS

CROSS REFERENCE TO RELATED APPLICATIONS

This application is a U.S. National Phase filing under 35 U.S.C. § 371 of PCT International Application No. PCT/US2014/026796, filed on Mar. 13, 2014, and claims benefit to U.S. Provisional Application No. 61/780,821, filed Mar. 13, 2013, which is hereby incorporated by reference in its entirety.

FIELD OF THE INVENTION

This invention relates generally to improved flexible composites and more particularly to improved flexible composites comprising unidirectional fiber-reinforced layers and scrim reinforcements and manufacturing methods for making the same.

BACKGROUND OF THE INVENTION

Flexible-composite materials are widely used in applications requiring both mechanical flexibility and high strength-to-weight ratios. Although flexible-composite materials may be considered a specialized subset of the larger body composite-materials, their importance in many specific areas of technology is significant.

As the term suggests, composite materials combine two or more constituent materials to form a unified material composition. An example of a flexible composite material would be a polymer matrix embedding an arrangement of flexible fibers.

Utilization of flexible-composite materials is envisioned in many technical fields ranging from simple consumer products to advanced aerospace applications. Thus, a system for quickly and economically producing high-quality flexible-composite materials would be of benefit to many.

SUMMARY OF THE INVENTION

Various embodiments of the present disclosure generally comprise flexible-composite materials that include scrim reinforcement. A composite material contains one or more unidirectional fiber-reinforced layers each having thinly spread parallel fibers coated with adhesive (these layers are termed unitapes). In accordance with one aspect of the present invention, the thin unitape layers can be manufactured using fiber bundles consisting of a plurality of monofilaments that are combined with a polymer resin and pultruded through a rotary die such that the monofilaments are spread and oriented parallel to each other. In accordance with another aspect, the composite material includes a woven or non-woven reinforcement laid scrim. Laid scrim is a lower cost reinforcing fabric made from continuous filament yarn in an open mesh construction. The laid scrim manufacturing process chemically bonds non-woven yarns together, enhancing the scrim with unique characteristics. The laid scrim is a cost effective way to add fiber reinforcement to a composite material especially in bias orientations (for example, about +/−30°, +/−45°, +/−60°) because the added processing steps to add unitape bias plies are skipped and replaced by inserting a pre-manufactured scrim. The laid scrim may be pre-coated with adhesive, pre-laminated to supporting films, or it may be necessary to sandwich it between unitape layers to glue it in place.

Another embodiment of the present disclosure generally comprises gapped flexible-composite materials made from two or more layers of unitapes that have adhesive and fiber free spaces to form a scrim. Thin unitape layers are manufactured using fiber bundles consisting of a plurality of monofilaments that are combined with a polymer resin and pultruded through a rotary die such that the monofilaments are spread and oriented parallel to each other. The key feature of this embodiment is that the fibers that make up the unitape are spread and either the distance between fibers is gapped such that an adhesive-free and fiber-free space between each group of monofilaments is formed, or fiber tows are removed after the monofilaments have been spread resulting in a similarly gapped unitape. A scrim is formed by bonding two or more of these unitape layers together. Additional films, membranes, fabrics, random oriented non-wovens, oriented non-wovens, scrims, or coatings may be applied to the outer surfaces or layered within this composite material.

Various embodiments include a reinforcement type that is a random oriented non-woven, or oriented non-woven constructed from engineering fibers such as, but are not limited to, UHMWPE (e.g. Spectra®, Dyneema®), aramids (e.g. Kevlar®), liquid crystal polymers (e.g. Vectran®), carbon fiber of various grades, PBO (e.g. Zylon®), nylon, polyester (Rayon), PEN, Nomex and other fire proof, high temperature fibers, steel or other metal fibers, and combinations thereof. This reinforcement layer may be bonded, fused, impregnated, extruded or coated to combine the reinforcement with a monolithic film (PET, Nylon, ECTFE, urethane, etc.), breathable membranes (Teflon, urethane, microporous, etc.), solvent or waterbased dispersion, woven or non-woven fabrics, leather, unidirectional tape, or other layers.

In various embodiments, the present disclosure encompasses a method of manufacturing a flexible-composite material, said method comprising providing at least one scrim layer and bonding at least one woven fabric, non-woven fabric, and/or membrane layer onto said at least one scrim layer. In various embodiments, the scrim layer comprises at least two unidirectional tape layers further comprising a plurality of parallel fiber bundles comprising monofilaments in an adhesive resin, wherein the fiber bundles are separated by gaps. In various embodiments, the scrim layer comprises a commercially available woven or non-woven reinforcement laid scrim. In various embodiments, the method further comprises the step of adding a breathable or non-breathable adhesive to fill said gaps.

In various embodiments, a method of manufacturing a flexible-composite material comprises: producing thin unitape layers comprising fiber bundles consisting of a plurality of monofilaments by combining said monofilaments with a polymer resin and pultruding said monofilaments through a rotary die such that said monofilaments are spread by gaps and oriented parallel to each other; producing a scrim layer by combining at least two of said thin unitape layers; and bonding at least one of a woven fabric, non-woven fabric, and/or membrane layer onto at least one of said scrim layers. In various embodiments, the method further comprises the step of removing monofilaments to create and/or to augment said gaps. In various embodiments, the method further comprises adding a breathable or non-breathable adhesive to fill the gaps.

DETAILED DESCRIPTION OF THE INVENTION

Figure 1:
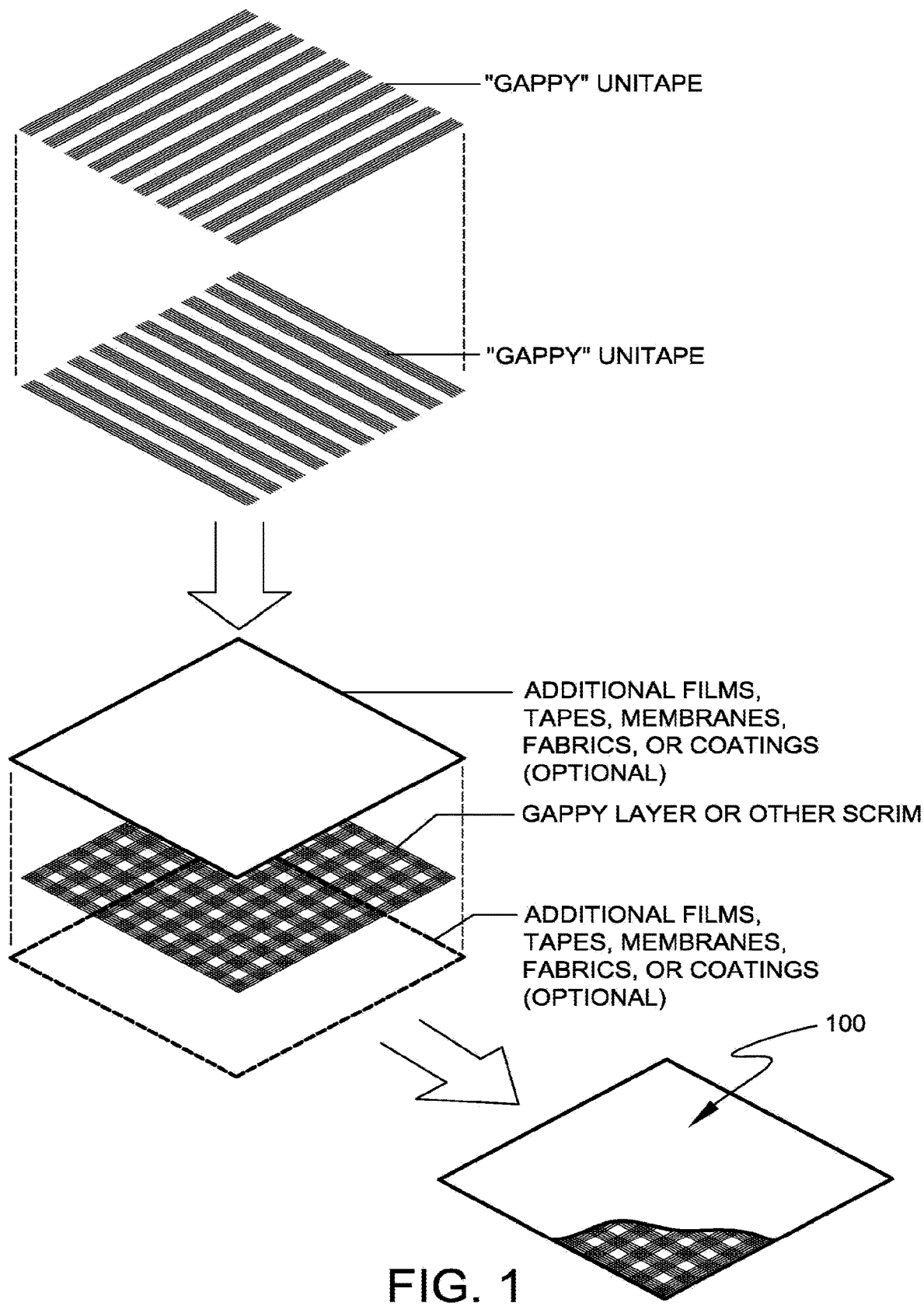
FIG. 1 shows a partial perspective view diagrammatically illustrating a product in accordance to the present disclosure where unitapes are oriented in two directions and combined with a scrim and outer surface coatings to form a composite material.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

As described in more detail herein, various embodiments of the present disclosure generally comprise flexible-composite materials comprising at least one scrim reinforcement.

TABLE 1 provides a glossary of terms and definitions that may be used in various portions of the present disclosure.

monofilaments have diameters less than about 60 microns and wherein spacing between individual monofilaments within an adjoining strengthening group of monofilaments is within a gap distance in the range between abutting and/or stacked monofilaments up to about 300 times the monofilament major diameter.

In accordance with one aspect of the present invention, the thin unitape layers can be manufactured using fiber bundles consisting of a plurality of monofilaments that are combined with a polymer resin and pultruded through a rotary die such that the monofilaments are spread and oriented parallel to each other. In accordance with another aspect, the composite material includes a woven or non-woven reinforcement laid scrim, such as material produced by Saint-Gobain ADFORS.

In general, laid scrim is a lower cost reinforcing fabric made from continuous filament yarn in an open mesh construction. The laid scrim manufacturing process chemically bonds non-woven yarns together, enhancing the scrim with unique characteristics. The laid scrim is a cost effective way to add fiber reinforcement to a composite material, especially in bias orientations (for example, about +/−30°, +/−45°, +/−60°) because the added processing steps to add unitape bias plies are skipped and replaced by inserting a pre-manufactured scrim. The laid scrim may be pre-coated with adhesive, pre-laminated to supporting films, or it may be necessary to sandwich it between unitape layers to glue it in place.

TABLE 1

BRIEF GLOSSARY OF TERMS AND DEFINITIONS

| Term | Definition |
|---|---|
| Adhesive | A resin used to combine composite materials. |
| Anisotropic | Not isotropic; having mechanical and or physical properties which vary with direction at a point in the material. |
| Areal Weight | The weight of fiber per unit area, often expressed as grams per square meter (g/m$^2$). |
| Autoclave | A closed vessel for producing a pressurized environment, with or without heat, to an enclosed object, which is undergoing a chemical reaction or other operation. |
| B-stage | Generally defined herein as an intermediate stage in the reaction of some resins. Materials are sometimes pre-cured to this stage, called "prepregs", to facilitate handling and processing prior to final cure. |
| C-Stage | Final stage in the reaction of certain resins in which the material is relatively insoluble and infusible. |
| Cure | To change the properties of a polymer resin irreversibly by chemical reaction. Cure may be accomplished by addition of curing (cross-linking) agents, with or without catalyst, and with or without heat. |
| Decitex (dtex) | Unit of the linear density of a continuous filament or yarn, equal to 1/10th of a tex or 9/10th of a denier. |
| Filament | The smallest unit of a fiber-containing material. Filaments usually are of long length and small diameter. |
| Polymer | An organic material composed of molecules of monomers linked together. |
| Prepreg | A ready-to-cure sheet or tape material. The resin is partially cured to a B-stage and supplied to a layup step prior to full cure. |
| Scrim | Light woven or non-woven fabric with relatively large openings between the yarns |
| Tow | A bundle of continuous filaments. |
| UHMWPE | Ultra-high-molecular-weight polyethylene. A type of polyolefin made up of extremely long chains of polyethylene. Trade names include Spectra ® and Dyneema ®. |
| Unitape | Unidirectional tape (or UD tape) - flexible reinforced tapes (also referred to as sheets) having uniformly-dense arrangements of reinforcing fibers in parallel alignment and impregnated with an adhesive resin. UD tapes are typically B-staged and can be used as layers for the composites herein. |

Scrim Reinforced Flexible Composite Materials

In accordance with various embodiments, this disclosure provides a composite material that includes a scrim reinforcing element and at least two unidirectional tapes having monofilaments therein, all of such monofilaments lying in a predetermined direction within the tapes, wherein such Additional films, laid scrims, membranes, fabrics, or coatings may be applied to the outer surfaces or layered within this composite material.

Scrim fiber types usable in the present system include, but are not limited to: Nylon, Polyester, UHPWPE (Spectra, Dyneema), para-Aramids (Kevlar, Nomex, Technora, Twaron), Liquid Crystal Polymer (Vectran), Polyimide, other synthetic polymers (PBO, PBI, PIBT, PBZT, PLA, PPTA), metal fiber, glass fiber, or any combinations thereof.

Scrim features and benefits include: dimensional stability, tensile strength, tear resistance.

TABLE 2

TECHNICAL CAPABILITIES AND SCRIM CHARACTERISTICS

| TECHNICAL CAPABILITIES | SCRIM CHARACTERISTICS |
| --- | --- |
| Width | Approximately 35 to about 5500 mm, e.g. about 38 to about 5300 mm |
| Roll length | Up to approximately 120,000 m |
| Yarns | Glass, polyester, nylon, UHMWPE, aramid, Twaron ® |
| Construction Patterns | Square, tri-, and quad-directional From about 0.2 yarns/cm to about 4 yarns/cm (about 0.5 yarn/in to about 18 yarns/in) |
| Tensile strength range | From approximately 17.5 to 568 N/5 cm in each direction |
| Bonding | PVOH, SBR, EVA, PVC, acrylic, etc. |
| Complexes for combination materials | A scrim bonded to any of glass, non-woven, polyester non-woven, specialty non-woven, film, etc. |

Scrim Construction Patterns

In various embodiments, scrim construction patterns that find use in various embodiments of the flexible-composites of the present disclosure, include, but are not limited to, "side-by-side," "over/under," "tri-directional," "quad-directional," and "complexes," each of which are described in more detail in TABLE 3 below.

TABLE 3

CONSTRUCTION PATTERNS:

Side by side

The simplest laid scrim pattern, the yarns from the top and bottom warp (machine direction) yarns lie next to each other with the fill (cross machine) yarns in between set at a 90° angle.
Over/Under Yarns from the two warp sheets lie directly on top of each other. The fill yarns are also set at a 90° angle. This construction offers increased dimensional stability.
Tri-directional Angled fill yarns are added to provide better aesthetics and redistributed strength.
Quad-directional Various scrims are bonded together chemically or thermally for increased strength and dimensional stability.
Complexes Scrim can be used individually or can be bonded to other substrates such as glass mat, synthetics, film and more.

"Gappy" Flexible-Composite Materials

A composite material in accordance with various embodiments of the present disclosure contains one or more unidirectional fiber-reinforced layers each having thinly spread parallel fibers coated with adhesive (these layers are termed unitapes). In accordance with one aspect, the thin unitape layers can be manufactured using fiber bundles consisting of a plurality of monofilaments that are combined with a polymer resin and pultruded through a rotary die such that the monofilaments are spread and oriented parallel to each other. In various embodiments, the fibers that make up the unitape are spread and, either the distance between fibers is "gapped" such that an adhesive and fiber free space between each group of monofilaments is formed, or fiber tows are removed after the monofilaments have been spread resulting in a similarly gapped unitape. A scrim can be formed by bonding two or more of these unitape layers together. In an alternative embodiment, the filaments that make up each fiber are overspread to form a "gappy" unitape. In this embodiment the distance between filaments is "gapped" such that an adhesive and fiber free space is formed.

In various embodiments, a breathable or non-breathable adhesive may be used to fill the gaps.

In various embodiments, the present disclosure encompasses a method of manufacturing a flexible-composite material, said method comprising: providing at least one scrim layer; and bonding at least one woven fabric, non-woven fabric, and/or membrane layer onto said at least one scrim layer. In various embodiments, the scrim layer comprises at least two unidirectional tape layers further comprising a plurality of parallel fiber bundles comprising monofilaments in an adhesive resin, wherein the fiber bundles are separated by gaps. In various embodiments, the scrim layer comprises a commercially available woven or non-woven reinforcement laid scrim. In various embodiments, the method further comprises the step of removing monofilaments from at least one of the unidirectional tape layers to create and/or to augment said gaps. In various embodiments, the method further comprises the step of adding a breathable or non-breathable adhesive to fill said gaps.

In various embodiments, a method of manufacturing a flexible-composite material comprises: producing thin unitape layers comprising fiber bundles consisting of a plurality of monofilaments by combining said monofilaments with a polymer resin and pultruding said monofilaments through a rotary die such that said monofilaments are spread by gaps and oriented parallel to each other; producing a scrim layer by combining at least two of said thin unitape layers; and bonding at least one of a woven fabric, non-woven fabric, and/or membrane layer onto at least one of said scrim layers. In various embodiments, the method further comprises the step of removing monofilaments from at least one of the unitapes to create and/or to augment said gaps. In various embodiments, the method further comprises adding a breathable or non-breathable adhesive to fill the gaps.

As illustrated in FIG. 1, a flexible composite 100 comprises (a) a scrim or gappy layer comprising two or more unitape layers; and (b) one or more films, tapes, membranes, fabrics, or coatings disposed on either or both sides of the scrim. In the embodiment of FIG. 1 for example, unitapes are oriented in two directions (0°/90°) and combined with a scrim or other gappy layer and optional outer surface coatings to form a composite material.

Figure 2:
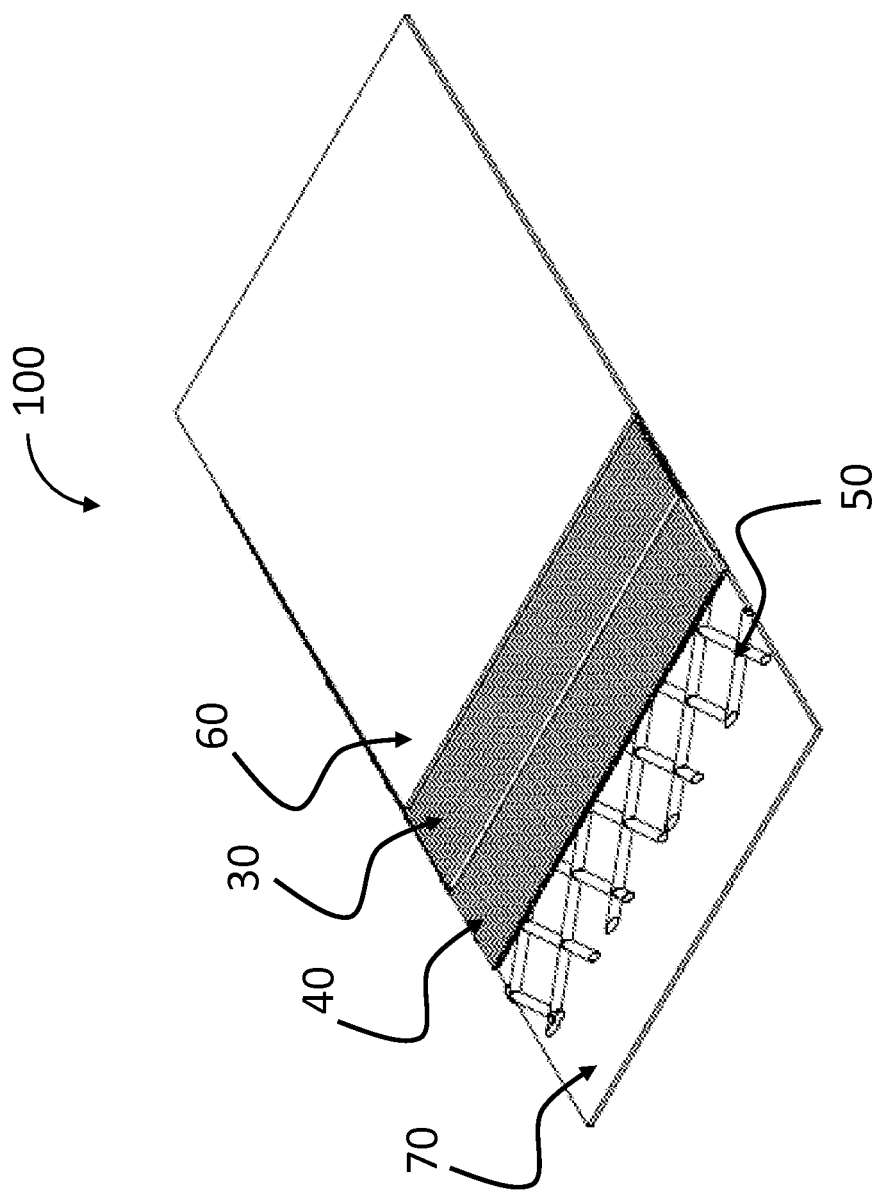
FIG. 2 shows a partial perspective view diagrammatically illustrating a product in accordance to the present disclosure where gappy unitapes are oriented in two directions and combined with outer surface coatings to form a composite material.

FIG. 2 diagrammatically illustrates an embodiment of a flexible composite 100 in accordance to the present disclosure where gappy unitapes 30 and 40 are oriented in two directions (approximately 0°/90°) and combined with both a scrim 50 and outer surface coatings 60 and 70 to form a composite material 100.

The above mentioned "Gappy" Flexible Composite product is useful because it can be used in breathable membrane applications due to the adhesive/fiber free gaps. This material may weigh less than a version with a continuous layer of filaments. Additionally this composite material may have improved drape and moldability compared to a version with a continuous layer of filaments.

In various embodiments, additional films, scrims, gappy layers, membranes, fabrics, random oriented non-wovens, oriented non-wovens, or coatings may be applied to the outer surfaces or layered within this composite material.

Various embodiments include a reinforcement type that is a random oriented non-woven, or oriented non-woven constructed from engineering fibers such as, but are not limited to, UHMWPE (e.g. Spectra®, Dyneema®), aramids (e.g. Kevlar®), liquid crystal polymers (e.g. Vectran®), carbon fiber of various grades, PBO (e.g. Zylon®), nylon, polyester (Rayon), PEN, Nomex and other fire proof, high temperature fibers, steel or other metal fibers, and combinations thereof. This reinforcement layer may be bonded, fused, impregnated, extruded or coated to combine the reinforcement with a monolithic film (PET, Nylon, ECTFE, urethane, etc.), breathable membranes (Teflon, urethane, microporous, etc.), solvent or waterbased dispersion, woven or non-woven fabrics, leather, unidirectional tape, or other layers.

In accordance with various embodiments, this disclosure provides a product wherein such at least one unidirectional tape is attached to such product.

In various embodiments, the flexible-composite materials of the present disclosure can be fine-tuned, at desired places on a product, to impart desired directional control of rigidity, flexibility and elasticity.

In various embodiments of the present disclosure, such a system comprises essentially one or more continuous "roll-to-roll" production process. In various embodiments, such a system is efficient, inexpensive, and useful.

In various embodiments of the present disclosure, the material layers are combined and cured together using pressure and temperature either by passing the stacked layers through a heated set of nips rolls, a heated press, a heated vacuum press, a heated belt press or by placing the stack of layers into a vacuum lamination tool and exposing the stack to heat. Moreover, external pressure, such as provided by an autoclave, may also be used to increase the pressure exerted on the layers. The vacuum lamination tool may be covered with a vacuum bag sealed to the lamination tool with a vacuum applied to provide pressure. Other lamination methods may also be suitable as would be known to one skilled in the art.

It should be noted that some low-surface-energy fibers require surface-energy modification prior to coating to promote bonding of the coating. Exemplary surface treatments include flame treatment, corona, plasma, and/or chemical treatment process. Subsequent, coating processes include, but are not limited to, curtain coating, gap coating, gravure coating, immersion coating, knife-over-roll coated, metered rod coating, reverse roll coating, roller coating, and extrusion coating.

Methods to partially or completely cure the above-noted coating include, but are not limited to: heated rolls, ovens, vacuum ovens, using light, Infrared, and/or UV curing. In one embodiment of the present system, a low temperature curing adhesive is used because the selected fabric is especially temperature sensitive. UWMWPE fabrics, for example, decompose at temperatures greater than 300° F. and the advised short-term duration temperature limit is 145° C. In another embodiment, a thermoset or partially thermoset adhesive is used because this coating is more robust and does not degrade with heat and UV exposure. In another embodiment, a thermoplastic adhesive is used, such as urethane, when subsequent bonding and seaming processes require a thermoplastic coating. If adhesive is only partially cured during coating process, a subsequent curing step is used to fully cure the product, subsequent curing methods include heated rolls, ovens, vacuum ovens, using light, Infrared, or UV curing, and/or autoclaves.

In another embodiment of the present system, the uncured or partially cured coated fabrics described in the previous embodiments proceed to an autoclave curing process. The uncured or partially cured coated fabric is placed between layers of release liner (e.g. comprising a fluoro-polymer film, e.g. Teflon), next applied are layers of peel ply and breather, and the stack sealed in a vacuum bag onto a hard caul. The autoclave uses controlled temperature, pressure, and vacuum to remove entrapped air and volatiles from the coating and flow the coating across the surface and through the thickness of the fabric.

In various embodiments, unitape sheets are layered in multiple orientations to form a two directional fiber reinforced sheet (such as approximately 0°/90°, +45°/−45°, +30°/−30°), or a four directional fiber reinforced sheet (such as approximately 0°/90°/45°/−45°, 0°/90°/30°/−30°, or other "custom" oriented fiber reinforced sheet with an endless number of orientations and layer combinations.

In various embodiments, at least one plastic film, such as PET, PEN, Nylon, fluoro-polymer, urethane, or others, is laminated to one or both sides of the above-mentioned embodiments, or alternately between layers of the above-mentioned embodiments, prior to the curing process. In other embodiments, a non-impregnated or impregnated fabric is laminated to one or both sides of the previous embodiments, or between layers of the above-mentioned embodiments, prior to the curing process.

In various embodiments, the composite material may include coloration of the matrix or membranes through use of pigments or dye sublimation.

In various embodiments, a fire retardant adhesive or polymer may be used, or fire retardants can be added to an otherwise flammable matrix or membrane to improve the flame resistance. Flame retardance or self-extinguishing matrix resins, or laminating or bonding adhesives such as Lubrizol 88111, can be used either by themselves, or in combination with fire retardant additives. Examples of retardant additives include: DOW D.E.R. 593 Brominated Resin, DOW Corning 3 Fire Retardant Resin, and polyurethane resin with Antimony Trioxide (such as EMC-85/10A from PDM Neptec ltd.), although other fire retardant additives may also be suitable. Fire retardant additives that may be used to improve flame resistance include Fyrol FR-2, Fyrol HF-4, Fyrol PNX, Fyrol 6, and SaFRon 7700, although other additives may also be suitable. Fire retardancy and self-extinguishing features can also be added to the fibers either by using fire retardant fibers such as Nomex or Kevlar, ceramic or metallic wire filaments, direct addition of fire retardant compounds to the fiber formulation during the fiber manufacturing process, or by coating the fibers with a sizing, polymer or adhesive incorporating fire retardant compounds listed above or others as appropriate. Any woven or scrim materials used in the laminate may be either be pretreated for fire retardancy by the supplier or coated and infused with fire retardant compounds during the manufacturing process.

In various embodiments, anti-microbial/anti-pathogen resistance may be added to the composite material by the incorporation of one or more of anti-microbial agents added or coated onto the polymer resins, or fabrics, and anti-microbial treatments to the fibers, monofilaments, threads or tows used for composite material. Typical materials include, but are not limited to, OXiTitan Antimicrobial, nano silver compounds, Sodium pyrithione, Zinc pyrithione 2-Fluoroethanol, 1-Bromo-2-fluoroethane, BenzimidaZole, Fleroxacin, 1,4-Butanedisulfonic acid disodium salt, 2-(2-pyridyl)

isothiourea N-oxide hydrochloride, Quarternary ammonium salt, 2-Pyridinethiol 1-oxide, Compound Zinc pyrithione, Compound copper pyrithione, magnesium pyrithione, BIS-PYRITHIONE, pyrithione, ot-Bromo Cinnam-Gel, KFO ABC Silica Gel manufactured. Fiber forms such as threads, tows and monofilaments can be treated with silver or other metal nanoparticles, or can have silver or other metal coatings applied via chemical or electrical plating, vacuum deposition or coating with a silver or metal compound containing polymer, adhesive or sizing; these coating can enhance electrical properties as well as anti-microbial/anti-pathogen properties. The anti-microbial/anti-pathogen materials may also be suitable.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A flexible-composite material comprising:
    at least one scrim, said scrim comprising two or more unidirectional tape layers laid in a side by side pattern; and
    two or more additional layers comprising at least one of a film or fabric, said additional layers disposed on both sides of said scrim,
    wherein each of said unidirectional tape layers comprise a plurality of parallel yarns, each of said yarns comprising a bundle of monofilaments in an adhesive resin, wherein the yarns are separated at from about 0.2 yarns/cm to about 4 yarns/cm by adhesive and fiber free gaps, and wherein said adhesive free gaps are filled with a non-breathable adhesive.

2. The flexible-composite material of claim 1, wherein said fabric is a non-woven fabric.

3. The flexible-composite material of claim 1, wherein said film is any one of PET, PEN, Nylon, fluoro-polymer, and urethane.

4. The flexible-composite material of claim 1, further comprising at least one non-impregnated fabric, wherein said non-impregnated fabric is: (a) laminated to one or both sides of said flexible-composite material, (b) disposed between any two of said two or more unidirectional tape layers, or (c) disposed between one of said two or more additional layers and said scrim.

5. The flexible composite material of claim 1, wherein said monofilaments comprise ultra-high molecular weight polyethylene.

6. A flexible-composite material comprising:
    at least one scrim further comprising at least two gapped unidirectional tape layers bonded together at a bias;
        wherein said gapped unidirectional tape layers each comprise a plurality of parallel yarns comprising monofilaments in an adhesive resin;
        wherein said yarns are overspread such that the yarns are separated by adhesive and fiber free gaps, said gaps filled with a non-breathable adhesive;
        wherein said monofilaments have diameters less than about 60 microns; and
    wherein spacing between individual monofilaments within an adjoining strengthening group of monofilaments is within a gap distance in the range between abutting and/or stacked monofilaments up to about 300 times the monofilament major diameter.

7. The flexible-composite material of claim 6, further comprising at least one non-woven fabric or film bonded to said at least one scrim.

8. The flexible-composite material of claim 7, wherein said film is any one of PET, PEN, Nylon, fluoro-polymer, and urethane.

9. The flexible-composite material of claim 7, further comprising at least one non-impregnated fabric, wherein said non-impregnated fabric is (a) laminated to one or both sides of said flexible-composite material, (b) disposed between said at least two gapped unidirectional tape layers, or (c) disposed between said woven fabric, random non-woven fabric, oriented non-woven fabric, film, or membrane and said scrim.

10. A method of manufacturing the flexible-composite material of claim 7, said method comprising:
    providing at least two gapped unidirectional tape layers bonded together to form at least one scrim; and
    bonding at least one woven fabric, random non-woven, oriented non-woven fabric, film and membrane layer onto said at least one scrim layer.

11. The method of claim 10, wherein said scrim layer comprises at least two gapped unidirectional tape layers further comprising a plurality of parallel fiber bundles comprising monofilaments in an adhesive resin, wherein said fiber bundles are separated by adhesive and fiber free gaps.

12. The method of claim 10 further comprising the step of removing select monofilaments from one or more of said unidirectional tape layers to create and/or to augment said gaps.

13. The method of claim 10, wherein said scrim layer comprises a commercially available woven or non-woven reinforcement laid scrim.

14. The method of claim 11, further comprising the step of adding a breathable or non-breathable adhesive to fill said gaps.

15. The flexible-composite material of claim 6, wherein said scrim comprises a construction pattern selected from the group consisting of side-by-side, over/under, tri-directional, and quad-directional.

16. The flexible-composite material of claim 6, wherein said monofilaments comprise ultra-high molecular weight polyethylene.

17. The flexible composite material of claim 6, wherein said monofilaments comprise ultra-high molecular weight polyethylene.

* * * * *